United States Patent [19]
Nakata

[11] 4,029,890
[45] June 14, 1977

[54] PARTICLE TRAPPING ELBOW JOINT FOR ENCLOSED HIGH VOLTAGE ELECTRIC BUS APPARATUS

[75] Inventor: Roy Nakata, Pittsfield, Mass.

[73] Assignee: General Electric Company, Philadelphia, Pa.

[22] Filed: Apr. 19, 1976

[21] Appl. No.: 678,091

[52] U.S. Cl. .......................... 174/14 R; 174/16 B; 174/21 C; 174/28

[51] Int. Cl.² .......................................... H01B 9/04

[58] Field of Search ................. 174/14 R, 16 B, 28, 174/29, 99 B, 21 R, 21 C, 21 CA

[56] References Cited

UNITED STATES PATENTS

| | | | |
|---|---|---|---|
| 3,515,939 | 6/1970 | Trump | 174/28 X |
| 3,639,671 | 2/1972 | Clark | 174/28 X |
| 3,688,015 | 8/1972 | Graybill | 174/28 X |
| 3,767,837 | 10/1973 | Graybill | 174/28 X |
| 3,777,045 | 12/1973 | Artbauer | 174/28 |
| 3,789,214 | 1/1974 | Goldie et al. | 174/28 X |
| 3,792,188 | 2/1974 | Cronin | 174/28 |
| 3,813,475 | 5/1974 | Cronin | 174/28 X |
| 3,814,879 | 6/1974 | Cookson et al. | 174/28 UX |
| 3,856,978 | 12/1974 | Sletten et al. | 174/28 X |
| 3,864,507 | 2/1975 | Fox et al. | 174/28 X |
| 3,895,176 | 7/1975 | Cookson et al. | 174/16 B |
| 3,898,367 | 8/1975 | Nakata | 174/28 X |

OTHER PUBLICATIONS

Cronin, J.C.; Perry, E.; Optimization of Insulators for Gas Insulated Systems, IEEE Trans. Pas., vol. Pas–2, No. 2, Mar./Apr. 1973, pp. 558–564.

Bortnik, I.M.; Cooke, C.M.; Electrical Breakdown and the Similarity in $SF_6$ at Extra High Voltages, IEEE Winter Meeting, Power Engineering Society, Jan./Feb. 1972.

Diessner, A.; Trump, J.C., Free Conducting Particles in a Coaxial Compressed–Gas–Insulated System, IEEE Transactions on Pas, vol. Pas–89, No. 8, Nov./Dec. 1970, pp. 1970–1978.

Primary Examiner—Arthur T. Grimley
Attorney, Agent, or Firm—William Freedman

[57] ABSTRACT

Gas-filled enclosed electric bus apparatus having an enlarged spherical elbow joint is provided with a joint housing having a deep particle trap directly beneath the spherical joint and at least one narrow entrance slot in the housing bottom wall. Each slot extends transversely of the longitudinal axis of a horizontal conductor connected at the joint and the housing bottom wall is inclined in all directions toward the trap.

3 Claims, 3 Drawing Figures

PARTICLE TRAPPING ELBOW JOINT FOR ENCLOSED HIGH VOLTAGE ELECTRIC BUS APPARATUS

My invention relates to high voltage electric bus apparatus comprising a bus conductor enclosed in coaxial, radially spaced relation within a tubular, grounded metal sheath. More particularly, the invention concerns angular or elbow joints in such apparatus of a design to trap and deactivate loose or free conductive particles, such as minute metallic filings and shavings, which unavoidably remain within the sheath after manufacture and assembly. The invention is especially useful in gas-insulated bus apparatus designed for use with conductor-to-sheath voltages of the order of 50,000 volts and upward, and particularly with unidirectional voltages of 200,000 volts or more.

Electric bus apparatus of the character described, when filled with insulating gas such as sulphurhexafluoride under pressure, has extremely high dielectric strength and is suitable for both alternating and direct current use at voltages well above 50,000 volts, as for example in the range 200,000 to 800,000 volts. At such voltages small loose solid particles, and particularly free conducting particles such as metal chips and shavings, which remain in the sheath even after careful mechanical cleaning prior to assembly, impair dielectric strength in a variety of ways. At such high voltage levels, and particularly in direct current applications, such particles may migrate between the grounded sheath and the enclosed high voltage conductor or remain in a levitated or patially levitated state adjacent the conductor surfaces. Under such conditions free conducting particles randomly in motion in the insulating gas space between electrodes may cause corona, sparks, "fire flies" and field distortion which severely reduce the electrode strength in the insulating gas space. In addition, such particles tend to adhere by electrostatic action to the surfaces of supporting insulators within the sheath, thereby to facilitate creepage and breakdown along the insulator surfaces. Theories underlying these actions are explained at greater length in a paper by Cronin et al entitled "Optimization of Insulators for Gas Insulated Systems", IEEE Transactions, Power Aparatus and Systems, Vol. PAS 92, No. 2 Mar./Apr. 1973 pages 558–564, in a paper by Trump and Diessner entitled "Free Conducting Particles in a Coaxial Compressed Gas Insulated System," IEEE Transactions, Power Aparatus and Systems, Vol. PAS 89, No. 8, Nov./Dec. 1970, pages 1970–1978, and in U.S. Pat. No. 3,814,879-Cookson et al.

It will be apparent from the foregoing patent and technical articles that various structures have been proposed for trapping free conducting particles in gas filled electric bus apparatus. Additional structures designed for this purpose are disclosed in U.S. Pats. Nos. 3,792,188-Cronin and 3,515,939-Trump. Examination of all these prior structures suggests that particle trapping regions in electric bus duct are preferably to be located in relatively low field regions, as distinguished from regions of high or concentrated electric stress such as commonly appear at angular joints. Prior efforts to remove particle trapping means to locations remote from an angular joint in such bus apparatus have resulted in complex and expensive joint structures.

I have discovered that when a unidirectional voltage supplied between the electrodes of an enclosed gas insulated electric bus apparatus is sufficiently high to levitate, or lift off, from the electrode surfaces any free conducting particles in the enclosure the particles will migrate back and forth between the electrodes, reversing their charge on each contact with an electrode. It can be demonstrated that with unidirectional voltage the lift off, or levitation, voltage is substantially the same as transit voltage. It is very difficult to trap particles continuously migrating in this manner between electrodes. It is also known that when alternating voltage is applied between such electrodes free conducting particles in the interelectrode space will be partially or barely levitated at a first high voltage level, but will not perform a full transit to the other electrode until a substantially higher voltage is applied. In the barely, or partially, levitated state particles are typically lifted from the surface and returned toward or into reengagement with the surface repeatedly and in random manner as they dance or oscillate in a narrow region immediately adjacent the electrode surface. In my patent application Ser. No. 636,254 filed Nov. 28, 1975 and assigned to the same assignee as the present application I have utilized these characteristics in combination with horizontal sheath structures providing ramped or inclined bottom surfaces to readily and efficiently clear the bus structure of free conducting particles. The present application is an improvement of the bus structure described and claimed in that earlier application and is particularly directed to an elbow or other angular joint structure of simplified particle trapping design.

Accordingly, it is a general object of my invention to provide an improved angulr joint for enclosed high voltage electric bus apparatus.

It is a more particular object of my invention to provide a simple and inexpensive particle trapping elbow joint in high voltage electric bus apparatus.

In carrying out my invention in one preferred embodiment I provide enclosed, gas-filled electric bus apparatus having adjacent sections intersecting at an angular joint, for example a right angle joint, with at least one section designed for disposition with its axis substantially horizontal. Such apparatus comprises a pair of tubular metallic sheath sections extending in coplanar angular relation from a joint or elbow housing and adapted for connection to ground or other low potential. Within each tubular sheath section I provide a central linear conductor supported in coaxial radially spaced relation within the sheath by a plurality of annular insulators, the central conductors intersecting within the joint housing at an enlarged spherical joint. Within the joint housing a deep trench or well type trapping recess is provided directly vertically below the spherical joint, and the bottom horizontal surface of the joint housing is inclined in all directions toward the trapping recess and thus away from any adjacent supporting insulator.

My invention will be more fully understood and its various objects and advantages further appreciated by referring now to the following detailed specification taken in conjunction with the accompanying drawing wherein.

Figure 1:
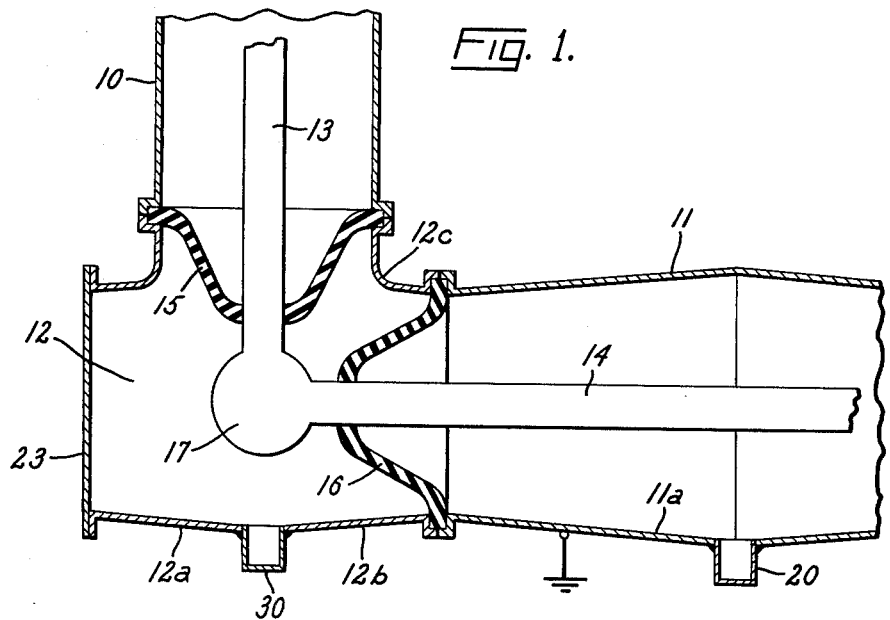
FIG. 1 is a fragmentary axial cross sectional view of enclosed electric bus apparatus illustrating an elbow joint embodying my invention in a form designed for use with one tubular axis of the joint housing vertical.

Referring now to the drawing, the illustrated bus apparatus comprises a pair of tubular sheath sections 10, 11 extending in coplanar angular relation from an elbow joint housing 12 coaxially within the tubular sheaths 10, 11 high voltage conductors 13, 14 respectively, are supported in radially spaced relation by annular insulators 15, 16 adjacent their proximate ends, the proximate ends of the conductors 13, 14 extending within the elbow housing 12 and terminating at an enlarged spherical connector 17. As illustrated the tubular sheath section 11 is designed for axially horizontal disposition and is axially flared in the direction away from the joint housing 12 at a small angle with respect to the sheath axis. Such flared configuration provides a bottom surface 11a which is inclined, or ramped, downwardly away from the juncture between the sheath section 11 and the joint housing 12. Such downward inclination of the bottom surface 11a terminates at a deep transverse trench type trapping receptacle 20 in the bottom surface of sheath section 11. At FIG. 1 the sheath section 10 is shown with its axis vertical, but if it were positioned horizontally it may be slightly flared or conical and provided with a transverse trap as described for section 11.

The annular supporting insulators 15, 16 are illustrated as of conical configuration, mounted at the junctures between the elbow housing 12 and the tubular sheath sections 10 and 11, respectively and extending into housing 12 toward the spherical bus connector 17. For access to the spherical connector 17 the joint housing 12 is provided with an opening in axial alignment with the conductor 14 and at the side of the joint housing 12 opposite the insulator 16. The access opening is shown closed by a cover plate 23.

For the purpose of inactivating and trapping any free conducting particles which may exist within the joint housing 12 between the insulators 15 and 16 the bottom surface of the elbow housing is provided, directly vertically beneath the spherical connector 17, with a trapping receptacle 30 formed as a deep and narrow transverse trench and is inclined upwardly in all directions away from the trap 30. While the cross sectional configuration of the tubular sheaths 10, 11 and the joint housing 12 is not shown in the drawing, it will be understood by those skilled in the art that various cross sectional shapes may be used, as circular, eliptical or rectangular. Preferably the sheath sections 10, 11 are circular in cross section and the sheath 11 is slightly conical along its horizontal axis, as shown. The joint housing 12 is formed as the intersection of a cylindrical vertical portion 12c with coaxial horizontal conical portions 12a, 12b oppositely tapered away from trap 30. Whatever the cross sectional shape, it is desired that the entire bottom surface area of the housing 12 be inclined toward the trap 30. If the housing 12 is formed of oppositely tapered conical parts 12a, 12b having horizontal axes, as shown, its circular cross section inherently inclines the bottom surface of housng 12 downwardly in all planes perpendicular to the conical axes and toward a linear nadir region directly below the conical axes. The axially opposite taper of the conical portions 12a, 12b inclines the nadir region in both axial directions toward the trap 30. Preferably the trap 30 is of trench-like shape, being elongate transversely of the horizontal bus axis and thus extending across the linear nadir region of the housing 12.

It will of course be understood by those skilled in the art that if the tubular portions of housing 12 are rectangular so that the oppositely axially inclined bottom surface is planar the entire area of the bottom surface of housing 12 will slope downwardly toward the trap 30 if trap extends as a trench transversely across the entrie housing 12 perpendicular to the horizontal axis of the bus apparatus. It should be pointed out, as taught in my aforesaid patent application Ser. No. 636,254, that the angle of axial inclination of the ramped bottom surfaces of the sheath portions 11 and 12 need be only of the order of 2° to 5° with respect to the horizontal axis.

It may now be noted that in operation, when high voltage is applied to the central conductor 13, 14, 17 and the sheath 10, 11, 12 is grounded the angular bend at the connector 17 results in high electric stress in the region of the connector 17. While its spherical configuration limits stress concentration immediately adjacent the connector 17, electric stress within the joint housing 12 is relatively high because of the conductor bend. Without my ramped bottom surfaces loose conducting particles would therefore tend to move toward the connector 17 and thus onto the insulators 15, 16. To avoid deposit of conducting particles on the insulators some prior structures have extended the horizontal conductor and housing axially beyond the elbow joint (as to the left at FIG. 1) and well beyond any supporting insulators for the horizontal conductor.

My new and novel joint housing eliminates the need for awkward and costly extensions at angular bus joints. By inclining the bottom surfaces of the elbow housing 12 toward the trap 30 I find that the trap may be located centrally in the housng and directly below the joint connector 17 while still effective to trap and retain free conducting particles. The action is particularly effective when an alternating voltage is applied between the central conductor and sheath and is gradually increased in a range of magnitudes sufficient to levitate the free particles but not to transport them upward from the sheath to the high voltage conductor. In this condition the particles are found to dance about in oscillatory animation in a shallow surface region above the bottom surface of the sheath and to progress down the ramped surfaces into the trap 30, despite its location in a high stress region. This action and the method of producing it is more fully described and claimed in my foregoing patent application Ser. No. 636,254.

Figure 2:
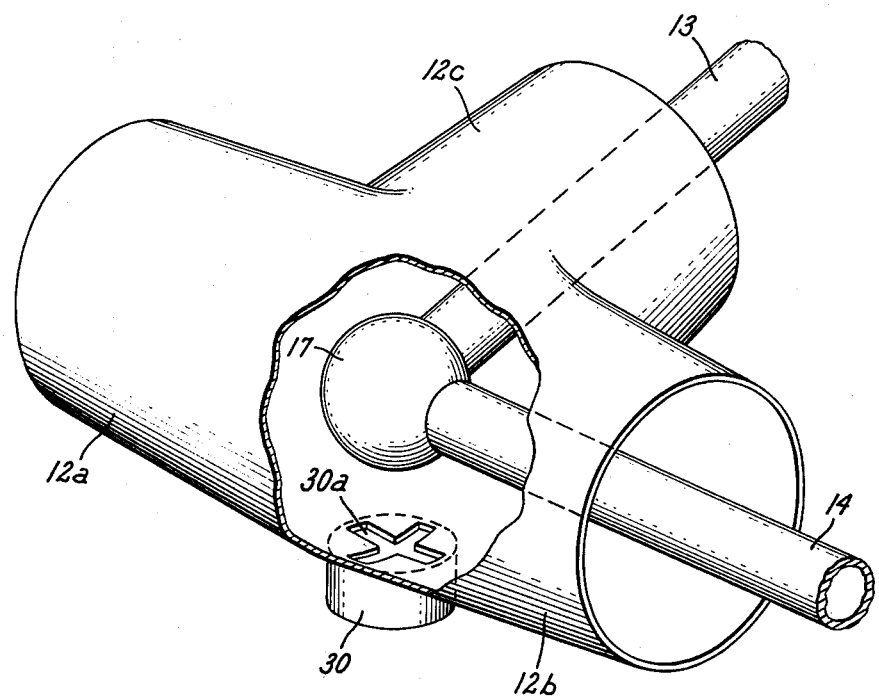
FIG. 2 is a perspective view of an elbow joint embodying my invention in a form designed for use with both vertical axes of the joint housing horizontal.

As previously noted the T-shaped housing 12 of FIGS. 1 and 2 is illustrated with the axis of tubular portion 12c vertical. At FIG. 2 I have illustrated in perspective view a similar T-shaped joint housing designed for disposition with both its tubular axes in a horizontal plane. At FIG. 2 parts corresponding to like parts at FIG. 1 I have been assigned the same reference numerals. In FIG. 2 however the housing portion 12c is also slightly conical, as are portions 12a, 12b, and is axially tapered away from the transverse axis of portions 12a, 12b. In this case the particle trap 30 may be circular (as shown) or rectangular with an X-shaped entrance aperture 30a formed by two intersecting slots. The slots 30a are located in the lowest region of the bottom wall of the housing 12 vertically beneath the connector 17. As shown at FIG. 2 one trapping slot is perpendicular to the axis of housing portions 12a, 12b and the other trapping slot is perpendicular to the axis of housing portion 12c.

Figure 3:
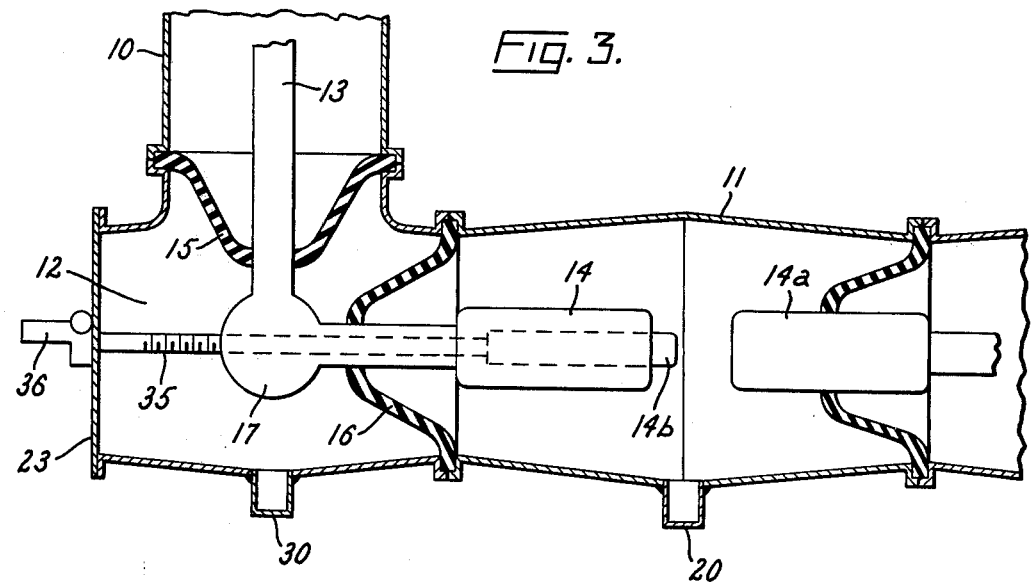
FIG. 3 is a view similar to that of FIG. 1 showing an elbow joint embodying my invention in combination with a disconnect switch associated with the joint.

Elbow joints of enclosed electric bus apparatus are frequently used to incorporate manual or motor driven disconnect switches in the high voltage central conductor. Because it enables simplification of the joint structure my invention is paricularly applicable to disconnect switches of this type. At FIG. 3 I have shown such a disconnect switch at an elbow joint otherwise similar to that at FIG. 1. In FIG. 3 the disconnect switch comprises a contact socket housing 14a and a movable stab contact 14b in the conductor 14. The stab contact 14b is driven axially into and out of engagement with a fixed contact in the socket 14a by means of a travelling nut mechanism (not shown) on a threaded shaft 35. The threaded 35 is driven by a motor 36 and should be of insulating material if an isolating type disconnect switch is desired. In other respects the bus apparatus of FIG. 3 is similar to that of FIG. 1 and like parts are marked wih the same reference numerals.

While I have described and illustrated only preferred embodiments of my invention by way of example, many modifications will occur to those skilled in the art. I therefore, wish to have it understood that I intend in the appended claims to cover all such modifications as fall within the true spirit and scope of my invention.

What I claim as new and desire to secure by Letters Patent of the United States is:

1. In an enclosed angular joint between a pair of linear high voltage electric bus conductors disposed in coplanar angular relation and adapted to be disposed with the longitudinal axis of at least one said conductor horizontal, each said conductor being mounted in coaxial radially spaced relation within a tubular sheath of conducting material adapted to be maintained at ground potential, an enlarged connector of generally spherical configuration forming a conductive joint between said linear conductors, a joint housing coupled to both said tubular sheaths and having walls radially spaced from said connector, the bottom wall of said housing including a particle trapping recess substantially centrally positioned in said bottom wall directly beneath said enlarged connector, substantially the entire area of said bottom wall being inclined downwardly toward said recess at an angle to the horizontal of the order of at least 2° to 5°.

2. Enclosed electric bus apparatus according to claim 1 wherein said tubular sheaths are substantially cylindrical and said joint housing comprises opposed conical portions coaxial with the horizontal axis of said one conductor, said conical portions being oppositely tapered axially away from said trapping recess and said recess being elongate transversely of said horizontal axis.

3. Enclosed electric bus apparatus according to claim 1 wherein the longitudinal axes of both said bus conductors are horizontal, the bottom wall of said joint housing being provided with intersecting slots providing access to said particle trapping recess, said slots extending, respectively, transversely of said longitudinal axes.

* * * * *